United States Patent
Wu et al.

(10) Patent No.: US 11,711,037 B2
(45) Date of Patent: *Jul. 25, 2023

(54) OUTPUT INDUCTANCE VALUE CONTROLLING METHOD, APPARATUS, AND COMPUTER DEVICE FOR MULTI-TAP REACTOR

(71) Applicant: Guangdong Giwee Technology Co. Ltd., Foshan (CN)

(72) Inventors: Shixian Wu, Foshan (CN); Yulin Li, Foshan (CN)

(73) Assignee: GUANGDONG GIWEE TECHNOLOGY CO. LTD., Foshan (CN)

( * ) Notice: Subject to any disclaimer, the term of this patent is extended or adjusted under 35 U.S.C. 154(b) by 33 days.

This patent is subject to a terminal disclaimer.

(21) Appl. No.: 17/540,426

(22) Filed: Dec. 2, 2021

(65) Prior Publication Data

US 2022/0173683 A1     Jun. 2, 2022

(51) Int. Cl.
*H02P 13/06*     (2006.01)
*F24F 11/64*     (2018.01)
(Continued)

(52) U.S. Cl.
CPC ............ *H02P 13/06* (2013.01); *F24F 11/46* (2018.01); *F24F 11/64* (2018.01); *F24F 11/88* (2018.01); *G05F 1/147* (2013.01)

(58) Field of Classification Search
CPC .. F24F 11/64; F24F 11/88; F24F 11/46; H02P 13/06; H02P 5/46; H02P 23/14; H02P 13/00; G05F 1/147
See application file for complete search history.

(56) References Cited

U.S. PATENT DOCUMENTS

2002/0030462 A1\* 3/2002 Matsushiro ............. H02P 6/085
                                                              318/727
2006/0119302 A1\* 6/2006 Yang ....................... H02P 29/02
                                                              318/434

(Continued)

FOREIGN PATENT DOCUMENTS

CN     106438317 A     2/2017
FR        2154033 A5     5/1973

(Continued)

OTHER PUBLICATIONS

European Search Report for Application No. 21212061.2; dated Apr. 13, 2022; 10 Pages.

*Primary Examiner* — Nelson J Nieves
(74) *Attorney, Agent, or Firm* — Cantor Colburn LLP (57) ABSTRACT

An output inductance value controlling method, apparatus, and computer device for a multi-tap reactor. A single output port of the multi-tap reactor is correspondingly connected to a single relay, and each relay is connected to a general power supply of all air conditioner internal units. When in use, an air conditioning system acquires a motor speed and a phase current of each air conditioner internal unit separately, and then calculates a sum of motor powers of all the air conditioner internal units according to the motor speeds and the phase currents. The system matches a basic inductance value required by the air conditioner internal units according to the sum of motor powers, sets a current output inductance value of the multi-tap reactor according to the basic inductance value, and inputs the output inductance value into the corresponding air conditioner internal units.

10 Claims, 3 Drawing Sheets

(51) Int. Cl.
*F24F 11/88* (2018.01)
*F24F 11/46* (2018.01)
*G05F 1/147* (2006.01)

(56) References Cited

U.S. PATENT DOCUMENTS

| | | | |
|---|---|---|---|
| 2007/0090785 A1* | 4/2007 | Ho | H02P 23/14 |
| | | | 318/812 |
| 2015/0211760 A1* | 7/2015 | Wang | F04D 27/001 |
| | | | 417/44.11 |
| 2016/0282005 A1* | 9/2016 | Kim | F24F 11/77 |
| 2020/0228033 A1* | 7/2020 | Huo | H02P 21/18 |
| 2021/0167710 A1* | 6/2021 | Kuikka | H02P 23/14 |

FOREIGN PATENT DOCUMENTS

| | | |
|---|---|---|
| JP | 2012120291 A | 6/2012 |
| JP | 2013138580 A | 7/2013 |

\* cited by examiner

OUTPUT INDUCTANCE VALUE CONTROLLING METHOD, APPARATUS, AND COMPUTER DEVICE FOR MULTI-TAP REACTOR

FOREIGN PRIORITY

This application claims priority to Chinese Patent Application No. 202011405861.X, filed Dec. 2, 2020, and all the benefits accruing therefrom under 35 U.S.C. § 119, the contents of which in its entirety are herein incorporated by reference.

TECHNICAL

The present application relates to the field of air conditioner technologies, and in particular to an output inductance value controlling method, apparatus, and computer device for a multi-tap reactor.

BACKGROUND

During operation of an air conditioner, an alternative current (AC) input current will produce severe waveform distortion, and inject a large number of higher harmonics into a power grid. In order to reduce current harmonic components and improve a power factor, existing manufacturers will provide a reactor connected in series to an AC input end of each air conditioner. When a set of air conditioner includes multiple internal units, each internal unit needs to be provided with an additional reactor, which will cause an extremely high production cost of the air conditioner. Moreover, a single reactor has a fixed inductance value which cannot be adjusted accordingly, thus having a low applicability.

SUMMARY

A main objective of the present application is to provide an output inductance value controlling method, apparatus, and computer device for a multi-tap reactor, aiming to solve the disadvantages of the existing air conditioner with multiple internal units including high production cost and low applicability of internal reactors.

In order to achieve the above objective, an output inductance value controlling method for a multi-tap reactor is provided in the present application. A single output port of the multi-tap reactor is correspondingly connected to a single relay, and each relay is connected to a general power supply of all air conditioner internal units. The controlling method includes: acquiring a motor speed and a phase current of each of the air conditioner internal units separately; calculating a sum of motor powers of all the air conditioner internal units according to the motor speeds and the phase currents; determining a basic inductance value required by the air conditioner internal units according to the sum of motor powers; and setting an output inductance value of the multi-tap reactor according to the basic inductance value, and inputting the output inductance value into the general power supply of the air conditioner internal units.

Further, the step of calculating a sum of motor powers of all the air conditioner internal units according to the motor speeds and the phase currents includes: substituting the motor speed and phase current of the air conditioner internal unit into a preset formula, and calculating a motor power of the air conditioner internal unit, wherein the preset formula is: $P=3K_e \times I \times N/9.5493$, P is the motor power, $K_e$ is a back electromotive force constant, I is the phase current, and N is the motor speed; and adding the motor powers corresponding to the air conditioner internal units, and calculating the sum of motor powers.

Further, the step of determining a basic inductance value required by the air conditioner internal units according to the sum of motor powers includes: retrieving a power and inductance value mapping relationship table, the power and inductance value mapping relationship table including multiple groups of power and inductance value, and a single power corresponding to a single inductance value; and filtering out the inductance value corresponding to the sum of motor powers from the power and inductance value mapping relationship table.

Further, the step of setting an output inductance value of the multi-tap reactor according to the basic inductance value, and inputting the output inductance value into the general power supply of the air conditioner internal units includes: selecting a corresponding first output port on the multi-tap reactor according to the basic inductance value; and controlling a first relay connected to the first output port to be closed, so that the first output port is connected to the general power supply of the air conditioner internal unit, and inputting the output inductance value to the general power supply of the air conditioner internal unit.

Further, the step of acquiring a motor speed and a phase current of each of the air conditioner internal units separately includes: establishing communication with a direct current (DC) motor drive module board of the air conditioner internal unit, the DC motor drive module board being configured to control a working state of a DC motor of the air conditioner internal unit; and obtaining the motor speed and phase current of the air conditioner internal unit through a communication protocol corresponding to the establishment of communication with the DC motor drive module board.

Preferably, the communication protocol includes motor speed data and phase current data of the DC motor, and the communication protocol stipulates that the DC motor drive module board sends the motor speed data and the phase current data according to a preset frequency.

An output inductance value controlling apparatus for a multi-tap reactor is further provided in the present application. A single output port of the multi-tap reactor is correspondingly connected to a single relay, and each relay is connected to a general power supply of all air conditioner internal units. The controlling apparatus includes: an acquisition module configured to acquire a motor speed and a phase current of each of the air conditioner internal units separately; a calculation module configured to calculate a sum of motor powers of all the air conditioner internal units according to the motor speeds and the phase currents; a matching module configured to determine a basic inductance value required by the air conditioner internal units according to the sum of motor powers; and an outputting module configured to set an output inductance value of the multi-tap reactor according to the basic inductance value, and input the output inductance value into the general power supply of the air conditioner internal units.

Further, the calculation module includes: a first calculation unit configured to substitute the motor speed and phase current of the air conditioner internal unit into a preset formula, and calculate a motor power of the air conditioner internal unit, wherein the preset formula is: $P=3K_e \times I \times N/9.5493$, P is the motor power, $K_e$ is a back electromotive force constant, I is the phase current, and N is the motor speed; and a second calculation unit configured to add the motor powers corresponding to the air conditioner internal units, and calculate the sum of motor powers.

Further, the matching module includes: a retrieval unit configured to retrieve a power and inductance value mapping relationship table, the power and inductance value mapping relationship table including multiple groups of power and inductance value, and a single power corresponding to a single inductance value; and a filtering unit configured to filter out the inductance value corresponding to the sum of motor powers from the power and inductance value mapping relationship table.

Further, the outputting module includes: a selection unit configured to select a corresponding first output port on the multi-tap reactor according to the basic inductance value; and a control unit configured to control a first relay connected to the first output port to be closed, so that the first output port is connected to the general power supply of the air conditioner internal unit, and input the output inductance value to the general power supply of the air conditioner internal unit.

Further, the acquisition module includes: a communication unit configured to establish communication with a DC motor drive module board of the air conditioner internal unit, the DC motor drive module board being configured to control a working state of a DC motor of the air conditioner internal unit; and an acquisition unit configured to obtain the motor speed and phase current of the air conditioner internal unit through a communication protocol corresponding to the establishment of communication with the DC motor drive module board.

Preferably, the communication protocol in the acquisition unit includes motor speed data and phase current data of the DC motor, and the communication protocol stipulates that the DC motor drive module board sends the motor speed data and the phase current data according to a preset frequency.

A computer device is further provided in the present application, including a memory and a processor, the memory stores a computer program, and the processor, when executing the computer program, implements the steps of any one of the above methods.

A computer-readable storage medium having a computer program stored thereon is further provided in the present application, and the computer program, when executed by a processor, implements the steps of any one of the above methods.

An output inductance value controlling method, apparatus, and computer device for a multi-tap reactor are provided in the present application. A single output port of the multi-tap reactor is correspondingly connected to a single relay, and each relay is connected to a general power supply of all air conditioner internal units. When in use, an air conditioning system obtains a motor speed and a phase current of each air conditioner internal unit separately, and then calculates a sum of motor powers of all the air conditioner internal units according to the motor speeds and the phase currents. The system matches a basic inductance value required by the air conditioner internal units according to the sum of motor powers, sets a current output inductance value of the multi-tap reactor according to the basic inductance value, and inputs the output inductance value into the corresponding air conditioner internal units, thereby reducing harmonic components generated during operation of the corresponding air conditioner internal units. In the present application, the air conditioning system dynamically adjusts the inductance value output by the multi-tap reactor according to real-time powers of all the air conditioner internal units, which can effectively reduce the harmonic components generated by the air conditioner during operation, and has high applicability. At the same time, there is no need to arrange a large number of reactors, which effectively reduces the production cost of the air conditioner.

The implementation of the objectives, functional characteristics, and advantages of the present application will be further described with reference to the embodiments and the accompanying drawings.

DETAILED DESCRIPTION

In order to make the objectives, technical solutions, and advantages of the present application clearer, the application present will be further described in detail below with reference to the accompanying drawings and embodiments. It should be understood that the specific embodiments described here are only used to explain the present application, and are not intended to limit the present application.

Figure 1:
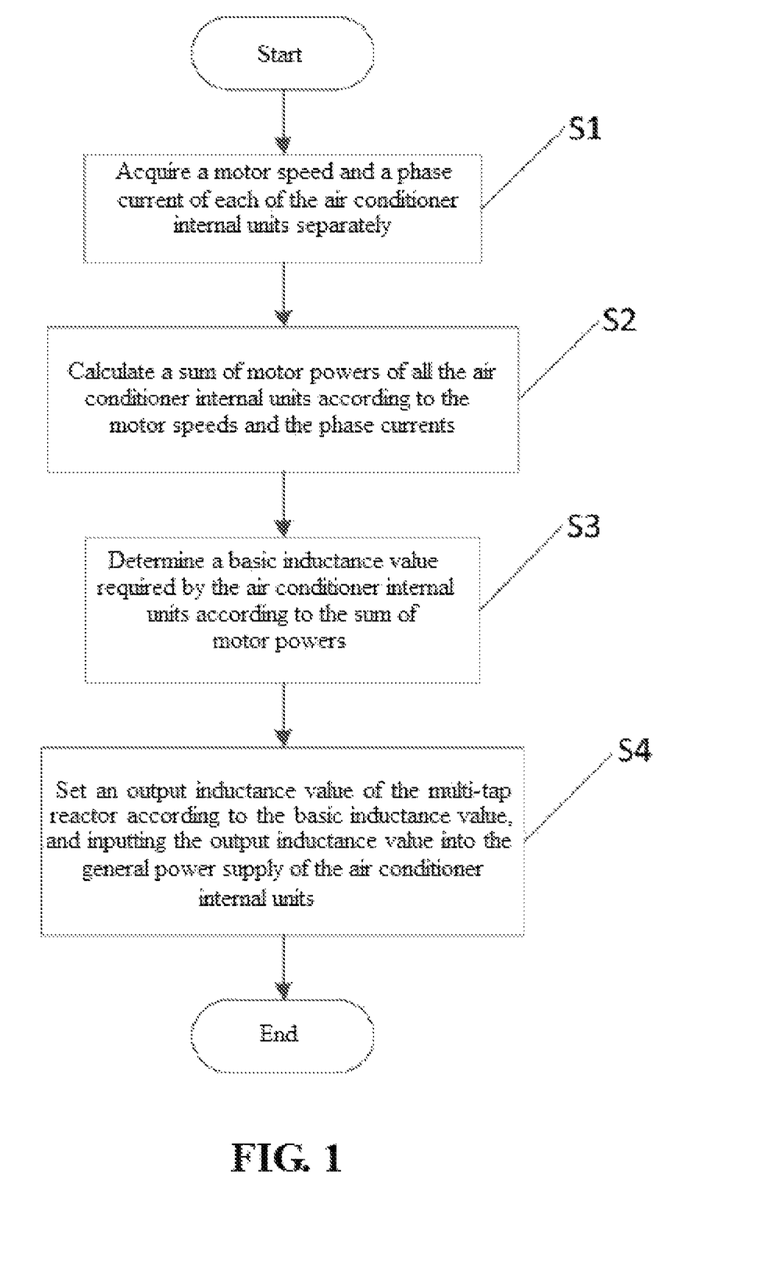
FIG. 1 is a schematic diagram of steps of an output inductance value controlling method for a multi-tap reactor according to an embodiment of the present application.
Figure 2:
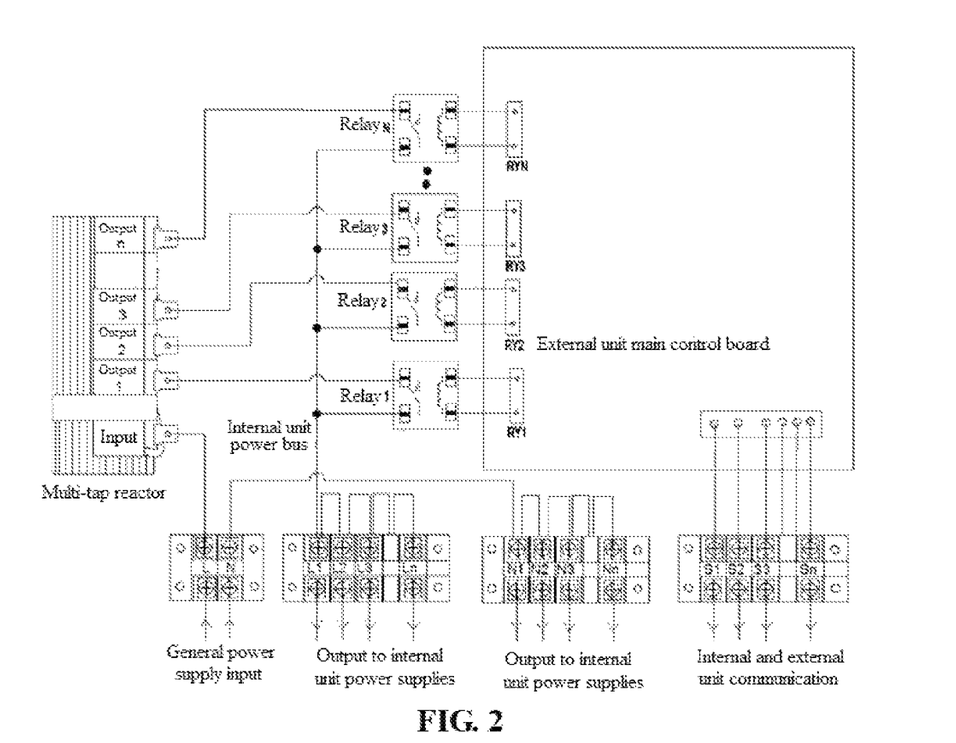
FIG. 2 is a circuit diagram of connections between a multi-tap reactor and an air conditioner external unit as well as air conditioner internal units according to an embodiment of the present application.

Referring to FIG. 1 and FIG. 2, an output basic inductance value controlling method for a multi-tap reactor is provided in an embodiment of the present application. A single output port of the multi-tap reactor is correspondingly connected to a single relay, and each relay is connected to a general power supply of all air conditioner internal units. The controlling method includes: S1: acquiring a motor speed and a phase current of each of the air conditioner internal units separately; S2: calculating a sum of motor powers of all the air conditioner internal units according to the motor speeds and the phase currents; S3: determining a basic inductance value required by the air conditioner internal units according to the sum of motor powers; and S4: setting an output inductance value of the multi-tap reactor according to the basic inductance value, and inputting the output inductance value into the general power supply of the air conditioner internal units.

In this embodiment, the air conditioner as a whole is composed of an air conditioner external unit connected to multiple air conditioner internal units, and a multi-tap reactor is installed on the air conditioner external unit. The multi-tap reactor has multiple output ports, a single output port is connected to a single relay, and each relay is connected to a common end of the general power supply of all the air conditioner internal units. In an initial state, only an initially set relay 1 is closed, for providing standby power to the internal units, and other relays are in a disconnected state. When the air conditioner is working, the system collects a motor speed and a phase current of each air conditioner internal unit in real time through internal and external unit communication established between an external unit electric control board and an internal unit main control board. The system calculates a real-time motor power of a single air conditioner internal unit based on the motor speed and phase current of the single air conditioner internal unit. Then, the motor powers corresponding to various air conditioner internal units are added to calculate a sum of motor powers of all the air conditioner internal units in the air conditioner. A power and inductance value mapping relationship table is stored in an internal database of the system, and the power and inductance value mapping relationship table includes multiple groups of one-to-one corresponding power and inductance value. The corresponding relationship between power and inductance value is obtained by a designer in an actual test, which is related to the specification of the air conditioner internal unit, and is not limited here. The system filters out a basic inductance value corresponding to the currently calculated motor power from the power and inductance value mapping relationship table. The basic inductance value is a basic value of an output inductance value for the subsequent selection of the corresponding output port on the multi-tap reactor. Specifically, the output ports of the multi-tap reactor have a sequence and have different output inductance values, and there is a certain inductance value difference between each other. The inductance value difference is designed by the designer according to requirements of the air conditioner internal unit. Moreover, the output inductance values of the output ports ascend by the inductance value differences according to the sequence. According to the basic inductance value calculated above, the system selects a first output port corresponding to the basic inductance value on the multi-tap reactor (the output inductance value of the first output port is the same or similar to the basic inductance value). Then, a first relay connected to the first output port is controlled to be closed (other relays still keep a disconnected state at this time), so that the first output port is connected to the general power supply of the air conditioner internal unit. At this time, the multi-tap reactor inputs the output inductance value corresponding to the basic inductance value into the general power supply of the air conditioner internal unit through the first output port, thereby reducing the harmonic components generated by the air conditioner during operation. In this embodiment, during the operation of the air conditioner, the system dynamically adjusts the current output inductance value of the multi-tap reactor according to the motor speed and phase current corresponding to each air conditioner internal unit, thereby ensuring that the output inductance value can minimize the harmonic components generated by the air conditioner during operation, avoid serious harmonic pollution and interference to the power grid and other electrical devices, and improve the power factor and the utilization efficiency of electric energy. At the same time, the air conditioner does not need to be provided with multiple reactors, which can effectively reduce the production cost, simplify the structural design of the air conditioner, and facilitate installation.

Further, the step of calculating a sum of motor powers of all the air conditioner internal units according to the motor speeds and the phase currents includes: S201: substituting the motor speed and phase current of the air conditioner internal unit into a preset formula, and calculating a motor power of the air conditioner internal unit, wherein the preset formula is: $P=3K_e \times I \times N/9.5493$, P is the motor power, $K_e$ is a back electromotive force constant, I is the phase current, and N is the motor speed; and S202: adding the motor powers corresponding to the air conditioner internal units, and calculating the sum of motor powers.

In this embodiment, the system retrieves a pre-entered preset formula, and then substitutes the motor speed and phase current of a single air conditioner internal unit into the preset formula, thereby calculating a motor power of the air conditioner internal unit. The preset formula is: $P=3K_e \times I \times N/9.5493$, wherein P is the motor power, $K_e$ is the back electromotive force constant (a specific value thereof may be obtained from GB/T 30549-2014), I is the phase current, and N is the motor speed. According to the above preset formula, the system calculates the motor powers of the air conditioner internal units in parallel. Then, the system adds the motor powers of the air conditioner internal units to obtain the sum of current motor powers of all the air conditioner internal units. In this embodiment, it only needs to acquire the motor speed and phase current of the air conditioner internal unit, and the corresponding motor power can be calculated according to the preset formula, which is convenient and quick.

Further, the step of determining a basic inductance value required by the air conditioner internal units according to the sum of motor powers includes: S301: retrieving a power and inductance value mapping relationship table, the power and inductance value mapping relationship table including multiple groups of power and inductance value, and a single power corresponding to a single inductance value; and S302: filtering out the basic inductance value corresponding to the sum of motor powers from the power and inductance value mapping relationship table.

In this embodiment, a power and inductance value mapping relationship table is stored in an internal database of the system. The power and inductance value mapping relationship table includes multiple groups of power and inductance value, and a single power corresponds to an inductance value. The corresponding relationship between power and inductance value is obtained by the designer in actual tests. For example, the designer turns on a motor air conditioner of the air conditioner internal unit to 50 W, and a required inductance value is 5 mH after the test. In the power and inductance value mapping relationship table, 50 W corresponds to 5 mH. In a practical application, the corresponding relationship between power and inductance value is related to the specification of the air conditioner internal unit, and is not specifically limited here. The system compares the calculated sum of motor powers with the power and inductance value mapping relationship table, and filters out the inductance value corresponding to the current sum of motor powers, which is the basic inductance value.

Further, the step of setting an output inductance value of the multi-tap reactor according to the basic inductance value, and inputting the output inductance value into the general power supply of the air conditioner internal units includes: S401: selecting a corresponding first output port on the multi-tap reactor according to the basic inductance value; and S402: controlling a first relay connected to the first output port to be closed, so that the first output port is connected to the general power supply of the air conditioner internal unit, and inputting the output inductance value to the general power supply of the air conditioner internal unit.

In this embodiment, each output port on the multi-tap reactor has a different output inductance value, each output port has a corresponding serial number, and a port serial number and output inductance value mapping relationship table is stored in the system. The port serial number and output inductance value mapping relationship table includes multiple groups of port serial number and output inductance value, and a single port serial number corresponds to a single output inductance value. In the initial state (that is, when the air conditioner has just started, the output inductance value required by the multi-tap reactor has not been calculated), only an initially set relay is closed to provide standby power for each internal unit, and other relays are all in a disconnected state. After the corresponding basic inductance value is determined according to the sum of motor powers of all the air conditioner internal units, the system selects a port serial number that is the same or similar to the basic inductance value from the port serial number and output inductance value mapping table, and an output port corresponding to the port serial number is the first output port. When the output inductance values of the output ports of the multi-tap reactor are all different from the basic inductance value, the system selects an output port corresponding to the output inductance value that is closest to the basic inductance value and is greater than the basic inductance value. For example, the basic inductance value is 6 mH, as the closest to the basic inductance value, the output inductance value of an output port A is 5 mH, and the output inductance value of an output port B is 7 mH, then the system selects the output port B as the current first output port. The system controls the first relay connected to the first output port to be closed, so that the first output port is connected to the general power supply of the air conditioner internal units. The multi-tap reactor inputs the output inductance value into the general power supply of the air conditioner internal unit through the first output port, thus reducing the harmonic components generated by the air conditioner during operation.

Preferably, in the process of dynamically adjusting the output inductance value of the multi-tap reactor according to real-time powers of all the air conditioner internal units, the multi-tap reactor always keeps at least one relay connected, that is, a corresponding relay of the next output port is closed first before disconnecting the currently closed relay, thus ensuring that power is always provided for the internal units.

Further, the step of acquiring a motor speed and a phase current of each of the air conditioner internal units separately includes: S101: establishing communication with a DC motor drive module board of the air conditioner internal unit, the DC motor drive module board being configured to control a working state of a DC motor of the air conditioner internal unit; and S102: obtaining the motor speed and phase current of the air conditioner internal unit through a communication protocol corresponding to the establishment of communication with the DC motor drive module board.

Preferably, the communication protocol includes motor speed data and phase current data of the DC motor, and the communication protocol stipulates that the DC motor drive module board sends the motor speed data and the phase current data according to a preset frequency.

In this embodiment, the air conditioner includes an external unit electric control board, an internal unit main control board, and a DC motor drive module board. The external unit electric control board is arranged on the air conditioner external unit and is configured to control a working state of the air conditioner external unit. The internal unit main control board and the DC motor drive module board are arranged in the air conditioner internal unit. The internal unit main control board is configured to control a working state of the air conditioner internal unit, and the DC motor drive module board is configured to control a working state of the DC motor of the air conditioner internal unit. Internal and external unit communication is established between the external unit electric control board and the internal unit main control board, and the external unit electric control board can acquire operating parameters of the air conditioner internal unit through the internal and external unit communication. The internal unit main control board also establishes communication with the DC motor drive module board, so that the motor speed and phase current of the air conditioner internal unit can be obtained through a communication protocol corresponding to the establishment of communication with the DC motor drive module board. The external unit electric control board obtains the motor speed and phase current of the air conditioner internal unit from the internal unit main control board through an internal and external unit communication protocol, so that the air conditioning system can calculate a motor power of the air conditioner internal unit according to the motor speed and phase current. The communication protocol between the internal unit main control board and the DC motor drive module board, and the internal and external unit communication protocol between the external unit electric control board and the internal unit main control board both include the motor speed data and phase current data of the DC motor. Moreover, the motor speed data and phase current data are sent according to a preset frequency, for example, one frame of data is sent to the external unit electric control board every second.

An output basic inductance value controlling method for a multi-tap reactor is provided in this embodiment. A single output port of the multi-tap reactor is correspondingly connected to a single relay, and each relay is connected to a general power supply of all air conditioner internal units. When in use, an air conditioning system acquires a motor speed and a phase current of each air conditioner internal unit separately, and then calculates a sum of motor powers of all the air conditioner internal units according to the motor speeds and the phase currents. The system matches a basic inductance value required by the air conditioner internal units according to the sum of motor powers, sets a current output inductance value of the multi-tap reactor according to the basic inductance value, and inputs the output inductance value into the corresponding air conditioner internal units, thereby reducing harmonic components generated during operation of the corresponding air conditioner internal units. In the present application, the air conditioning system dynamically adjusts the inductance value output by the multi-tap reactor according to real-time powers of all the air conditioner internal units, which can effectively reduce harmonic components generated by the air conditioner during operation, and has high applicability. At the same time, there is no need to arrange a large number of reactors, which effectively reduces the production cost of the air conditioner.

Figure 3:
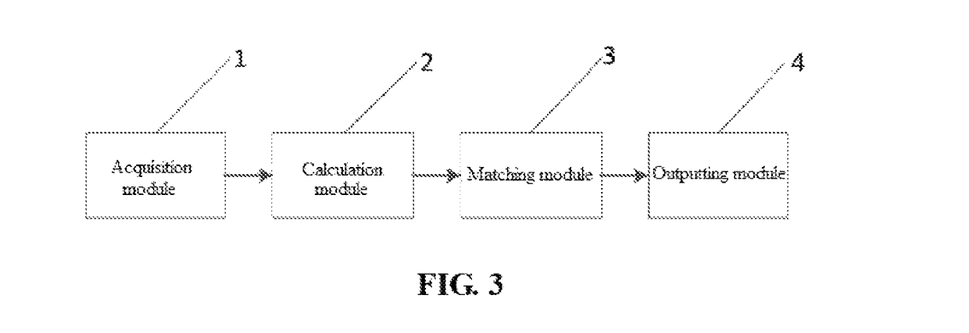
FIG. 3 is a block diagram of an overall structure of an output inductance value controlling apparatus for a multi-tap reactor according to an embodiment of the present application.

Referring to FIG. 3, an output inductance value controlling apparatus for a multi-tap reactor is further provided in an embodiment of the present application. A single output port of the multi-tap reactor is correspondingly connected to a single relay, and each relay is connected to a general power supply of all air conditioner internal units. The controlling apparatus includes: an acquisition module 1 configured to acquire a motor speed and a phase current of each of the air conditioner internal units separately; a calculation module 2 configured to calculate a sum of motor powers of all the air conditioner internal units according to the motor speeds and the phase currents; a matching module 3 configured to determine a basic inductance value required by the air conditioner internal units according to the sum of motor powers; and an outputting module 4 configured to set an output inductance value of the multi-tap reactor according to the basic inductance value, and input the output inductance value into the general power supply of the air conditioner internal units.

Further, the calculation module 2 includes: a first calculation unit configured to substitute the motor speed and phase current of the air conditioner internal unit into a preset formula, and calculate a motor power of the air conditioner internal unit, wherein the preset formula is: $P=3Ke \times I \times N/9.5493$, P is the motor power, Ke is a back electromotive force constant, I is the phase current, and N is the motor speed; and a second calculation unit configured to add the motor powers corresponding to the air conditioner internal units, and calculate the sum of motor powers.

Further, the matching module 3 includes: a retrieval unit configured to retrieve a power and inductance value mapping relationship table, the power and inductance value mapping relationship table including multiple groups of power and inductance value, and a single power corresponding to a single inductance value; and a filtering unit configured to filter out the inductance value corresponding to the sum of motor powers from the power and inductance value mapping relationship table.

Further, the outputting module 4 includes: a selection unit configured to select a corresponding first output port on the multi-tap reactor according to the basic inductance value; and a control unit configured to control a first relay connected to the first output port to be closed, so that the first output port is connected to the general power supply of the air conditioner internal unit, and input the output inductance value to the general power supply of the air conditioner internal unit.

Further, the acquisition module 1 includes: a communication unit configured to establish communication with a DC motor drive module board of the air conditioner internal unit, the DC motor drive module board being configured to control a working state of a DC motor of the air conditioner internal unit; and an acquisition unit configured to obtain the motor speed and phase current of the air conditioner internal unit through a communication protocol corresponding to the establishment of communication with the DC motor drive module board.

Preferably, the communication protocol in the acquisition unit includes motor speed data and phase current data of the DC motor, and the communication protocol stipulates that the DC motor drive module board sends the motor speed data and the phase current data according to a preset frequency.

In this embodiment, the modules and units of the controlling apparatus are configured to perform the steps in the above output inductance value controlling method for a multi-tap reactor, and the specific implementation process will not be described in detail here.

An output basic inductance value controlling apparatus for a multi-tap reactor is provided in this embodiment. A single output port of the multi-tap reactor is correspondingly connected to a single relay, and each relay is connected to a general power supply of all air conditioner internal units. When in use, an air conditioning system obtains a motor speed and a phase current of each air conditioner internal unit separately, and then calculates a sum of motor powers of all the air conditioner internal units according to the motor speeds and the phase currents. The system matches a basic inductance value required by the air conditioner internal units according to the sum of motor powers, sets a current output inductance value of the multi-tap reactor according to the basic inductance value, and inputs the output inductance value into the corresponding air conditioner internal units, thereby reducing harmonic components generated during operation of the corresponding air conditioner internal units. In the present application, the air conditioning system dynamically adjusts the inductance value output by the multi-tap reactor according to real-time powers of all the air conditioner internal units, which can effectively reduce harmonic components generated by the air conditioner during operation, and has high applicability. At the same time, there is no need to arrange a large number of reactors, which effectively reduces the production cost of the air conditioner.

Figure 4:
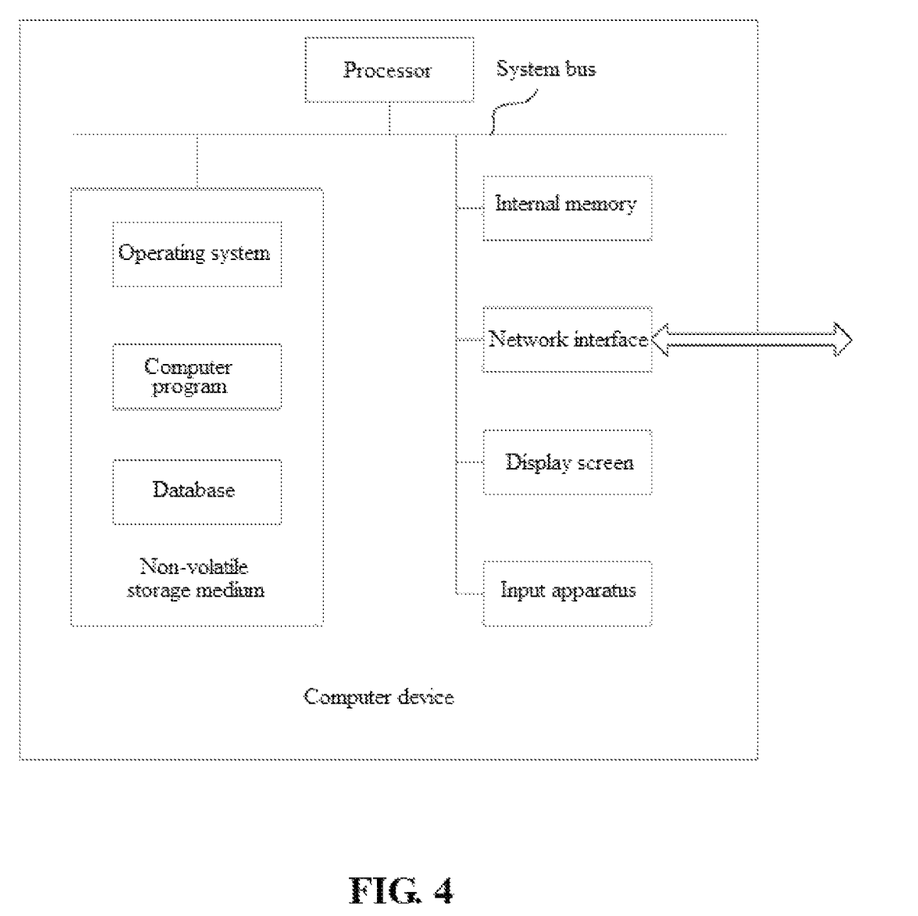
FIG. 4 is a schematic structural block diagram of a computer device according to an embodiment of the present application.

Referring to FIG. 4, a computer device is further provided in an embodiment of the present application. The computer device may be a server, and its internal structure may be as shown in FIG. 3. The computer device includes a processor, a memory, a network interface, and a database connected through a system bus. The processor designed by the computer is configured to provide calculation and control capabilities. The memory of the computer device includes a non-volatile storage medium and an internal memory. The non-volatile storage medium stores an operating system, a computer program, and a database. The internal memory provides an environment for operations of an operating system and computer programs in the non-volatile storage medium. The database of the computer device is configured to store data such as preset formulas. The network interface of the computer device is configured to communicate with an external terminal through a network connection. The computer program, when executed by the processor, implements an output basic inductance value controlling method for a multi-tap reactor. A single output port of the multi-tap reactor is correspondingly connected to a single relay, and each relay is connected to a general power supply of all air conditioner internal units.

The above processor performs the steps of the above output basic inductance value controlling method for a multi-tap reactor, including: S1: acquiring a motor speed and a phase current of each of the air conditioner internal units separately; S2: calculating a sum of motor powers of all the air conditioner internal units according to the motor speeds and the phase currents; S3: determining a basic inductance value required by the air conditioner internal units according to the sum of motor powers; and S4: setting an output inductance value of the multi-tap reactor according to the basic inductance value, and inputting the output inductance value into the general power supply of the air conditioner internal units.

Further, the step of calculating a sum of motor powers of all the air conditioner internal units according to the motor speeds and the phase currents includes: S201: substituting the motor speed and phase current of the air conditioner internal unit into a preset formula, and calculating a motor power of the air conditioner internal unit, wherein the preset formula is: $P=3Ke \times I \times N/9.5493$, P is the motor power, Ke is a back electromotive force constant, I is the phase current, and N is the motor speed; and S202: adding the motor powers corresponding to the air conditioner internal units, and calculating the sum of motor powers.

Further, the step of determining a basic inductance value required by the air conditioner internal units according to the sum of motor powers includes: S301: retrieving a power and inductance value mapping relationship table, the power and inductance value mapping relationship table including multiple groups of power and inductance value, and a single power corresponding to a single inductance value; and S302: filtering out the basic inductance value corresponding to the sum of motor powers from the power and inductance value mapping relationship table.

Further, the step of setting an output inductance value of the multi-tap reactor according to the basic inductance value, and inputting the output inductance value into the general power supply of the air conditioner internal units includes: S401: selecting a corresponding first output port on the multi-tap reactor according to the basic inductance value; and S402: controlling a first relay connected to the first output port to be closed, so that the first output port is connected to the general power supply of the air conditioner internal unit, and inputting the output inductance value to the general power supply of the air conditioner internal unit.

Further, the step of acquiring a motor speed and a phase current of each of the air conditioner internal units separately includes: S101: establishing communication with a DC motor drive module board of the air conditioner internal unit, the DC motor drive module board being configured to control a working state of a DC motor of the air conditioner internal unit; and S102: obtaining the motor speed and phase current of the air conditioner internal unit through a communication protocol corresponding to the establishment of communication with the DC motor drive module board.

Preferably, the communication protocol includes motor speed data and phase current data of the DC motor, and the communication protocol stipulates that the DC motor drive module board sends the motor speed data and the phase current data according to a preset frequency.

A computer-readable storage medium having a computer program stored thereon is further provided in an embodiment of the present application. The computer program, when executed by a processor, implements an output basic inductance value controlling method for a multi-tap reactor. A single output port of the multi-tap reactor is correspondingly connected to a single relay, and each relay is connected to a general power supply of all air conditioner internal units. The output basic inductance value controlling method for a multi-tap reactor specifically includes: S1: acquiring a motor speed and a phase current of each of the air conditioner internal units separately; S2: calculating a sum of motor powers of all the air conditioner internal units according to the motor speeds and the phase currents; S3: determining a basic inductance value required by the air conditioner internal units according to the sum of motor powers; and S4: setting an output inductance value of the multi-tap reactor according to the basic inductance value, and inputting the output inductance value into the general power supply of the air conditioner internal units.

Further, the step of calculating a sum of motor powers of all the air conditioner internal units according to the motor speeds and the phase currents includes: S201: substituting the motor speed and phase current of the air conditioner internal unit into a preset formula, and calculating a motor power of the air conditioner internal unit, wherein the preset formula is: $P=3K_e \times I \times N/9.5493$, P is the motor power, $K_e$ is a back electromotive force constant, I is the phase current, and N is the motor speed; and S202: adding the motor powers corresponding to the air conditioner internal units, and calculating the sum of motor powers.

Further, the step of determining a basic inductance value required by the air conditioner internal units according to the sum of motor powers includes: S301: retrieving a power and inductance value mapping relationship table, the power and inductance value mapping relationship table including multiple groups of power and inductance value, and a single power corresponding to a single inductance value; and S302: filtering out the basic inductance value corresponding to the sum of motor powers from the power and inductance value mapping relationship table.

Further, the step of setting an output inductance value of the multi-tap reactor according to the basic inductance value, and inputting the output inductance value into the general power supply of the air conditioner internal units includes: S401: selecting a corresponding first output port on the multi-tap reactor according to the basic inductance value; and S402: controlling a first relay connected to the first output port to be closed, so that the first output port is connected to the general power supply of the air conditioner internal unit, and inputting the output inductance value to the general power supply of the air conditioner internal unit.

Further, the step of acquiring a motor speed and a phase current of each of the air conditioner internal units separately includes: S101: establishing communication with a DC motor drive module board of the air conditioner internal unit, the DC motor drive module board being configured to control a working state of a DC motor of the air conditioner internal unit; and S102: obtaining the motor speed and phase current of the air conditioner internal unit through a communication protocol corresponding to the establishment of communication with the DC motor drive module board.

Preferably, the communication protocol includes motor speed data and phase current data of the DC motor, and the communication protocol stipulates that the DC motor drive module board sends the motor speed data and the phase current data according to a preset frequency.

A person of ordinary skill in the art can understand that all or part of the processes in the above embodiment methods can be implemented by instructing relevant hardware through a computer program. The computer program may be stored in a non-volatile computer readable storage medium, and the computer program, when executed, may include the processes of the above method embodiments. Any reference to memory, storage, database, or other media provided in the present application and used in the embodiments may include a non-volatile and/or volatile memory. The non-volatile memory may include a read-only memory (ROM), a programmable ROM (PROM), an electrically programmable ROM (EPROM), an electrically erasable programmable ROM (EEPROM), or a flash memory. The volatile memory may include a random-access memory (RAM) or an external cache memory. As an illustration rather than a limitation, the RAM is available in many forms, such as a static RAM (SRAM), a dynamic RAM (DRAM), a synchronous DRAM (SDRAM), a double speed rate SDRAM (SSRSDRAM), an enhanced SDRAM (ESDRAM), a synchronous link (Synchlink) DRAM (SLDRAM), a memory bus (Rambus) direct RAM (RDRAM), a direct Rambus dynamic RAM (DRDRAM), a Rambus dynamic RAM (RDRAM), and the like.

It should be noted that, the terms "include," "comprise," or any other variants thereof herein are intended to cover non-exclusive inclusion, so that a process, an apparatus, an article, or a method including a series of elements not only includes those elements but also include other elements not explicitly listed, or further includes elements inherent to the process, apparatus, article, or method. If there are no more restrictions, an element defined by the statement "including a(n) . . . " does not exclude the existence of other identical elements in the process, apparatus, article, or method that includes the element.

The above are only the preferred embodiments of the present application, and are not intended to limit the patent scope of the present application. Any equivalent structure or equivalent process transformation made using the content of the specification and the accompanying drawings of the present application, or direct or indirect applications in other related technical fields are included in the patent protection scope of the present application in the same way.

What is claimed is:

1. An output inductance value controlling method for a multi-tap reactor, wherein a single output port of the multi-tap reactor is correspondingly connected to a single relay, and each relay is connected to a general power supply of all air conditioner internal units, the controlling method comprising:
    acquiring a motor speed and a phase current of each of the air conditioner internal units separately;
    calculating a sum of motor powers of all the air conditioner internal units according to the motor speeds and the phase currents;
    determining a basic inductance value required by the air conditioner internal units according to the sum of motor powers; and
    setting an output inductance value of the multi-tap reactor according to the basic inductance value, and inputting the output inductance value into the general power supply of the air conditioner internal units.

2. The output inductance value controlling method for a multi-tap reactor according to claim 1, wherein the step of calculating a sum of motor powers of all the air conditioner internal units according to the motor speeds and the phase currents comprises:
    substituting the motor speed and phase current of the air conditioner internal unit into a preset formula, and calculating a motor power of the air conditioner internal unit, wherein the preset formula is: $P=3Ke\times I\times N/9.5493$, P is the motor power, Ke is a back electromotive force constant, I is the phase current, and N is the motor speed; and
    adding the motor powers corresponding to the air conditioner internal units, and calculating the sum of motor powers.

3. The output inductance value controlling method for a multi-tap reactor according to claim 1, wherein the step of determining a basic inductance value required by the air conditioner internal units according to the sum of motor powers comprises:
    retrieving a power and inductance value mapping relationship table, the power and inductance value mapping relationship table comprising multiple groups of power and inductance value, and a single power corresponding to a single inductance value; and
    filtering out the inductance value corresponding to the sum of motor powers from the power and inductance value mapping relationship table.

4. The output inductance value controlling method for a multi-tap reactor according to claim 1, wherein the step of setting an output inductance value of the multi-tap reactor according to the basic inductance value, and inputting the output inductance value into the general power supply of the air conditioner internal units comprises:
    selecting a corresponding first output port on the multi-tap reactor according to the basic inductance value; and
    controlling a first relay connected to the first output port to be closed, so that the first output port is connected to the general power supply of the air conditioner internal unit, and inputting the output inductance value to the general power supply of the air conditioner internal unit.

5. The output inductance value controlling method for a multi-tap reactor according to claim 1, wherein the step of acquiring a motor speed and a phase current of each of the air conditioner internal units separately comprises:
    establishing communication with a direct current (DC) motor drive module board of the air conditioner internal unit, the DC motor drive module board being configured to control a working state of a DC motor of the air conditioner internal unit; and
    obtaining the motor speed and phase current of the air conditioner internal unit through a communication protocol corresponding to the establishment of communication with the DC motor drive module board.

6. The output inductance value controlling method for a multi-tap reactor according to claim 5, wherein the communication protocol comprises motor speed data and phase current data of the DC motor, and the communication protocol stipulates that the DC motor drive module board sends the motor speed data and the phase current data according to a preset frequency.

7. An output inductance value controlling apparatus for a multi-tap reactor, wherein a single output port of the multi-tap reactor is correspondingly connected to a single relay, and each relay is connected to a general power supply of all air conditioner internal units, the controlling apparatus comprising:
    an acquisition module configured to acquire a motor speed and a phase current of each of the air conditioner internal units separately;
    a calculation module configured to calculate a sum of motor powers of all the air conditioner internal units according to the motor speeds and the phase currents;
    a matching module configured to determine a basic inductance value required by the air conditioner internal units according to the sum of motor powers; and
    an outputting module configured to set an output inductance value of the multi-tap reactor according to the basic inductance value, and input the output inductance value into the general power supply of the air conditioner internal units.

8. The output inductance value controlling apparatus for a multi-tap reactor according to claim 7, wherein the calculation module comprises:
    a first calculation unit configured to substitute the motor speed and phase current of the air conditioner internal unit into a preset formula, and calculate a motor power of the air conditioner internal unit, wherein the preset formula is: $P=3Ke\times I\times N/9.5493$, P is the motor power, Ke is a back electromotive force constant, I is the phase current, and N is the motor speed; and
    a second calculation unit configured to add the motor powers corresponding to the air conditioner internal units, and calculate the sum of motor powers.

9. A computer device comprising a memory and a processor, the memory storing a computer program, wherein the processor, when executing the computer program, implements the steps of the method according to claim 1.

10. A computer-readable storage medium having a computer program stored thereon, wherein the computer program, when executed by a processor, implements the steps of the method according to claim 1.

* * * * *